Feb. 3, 1942.   G. L. WICK   2,271,530
FILM HOLDER
Filed March 12, 1940
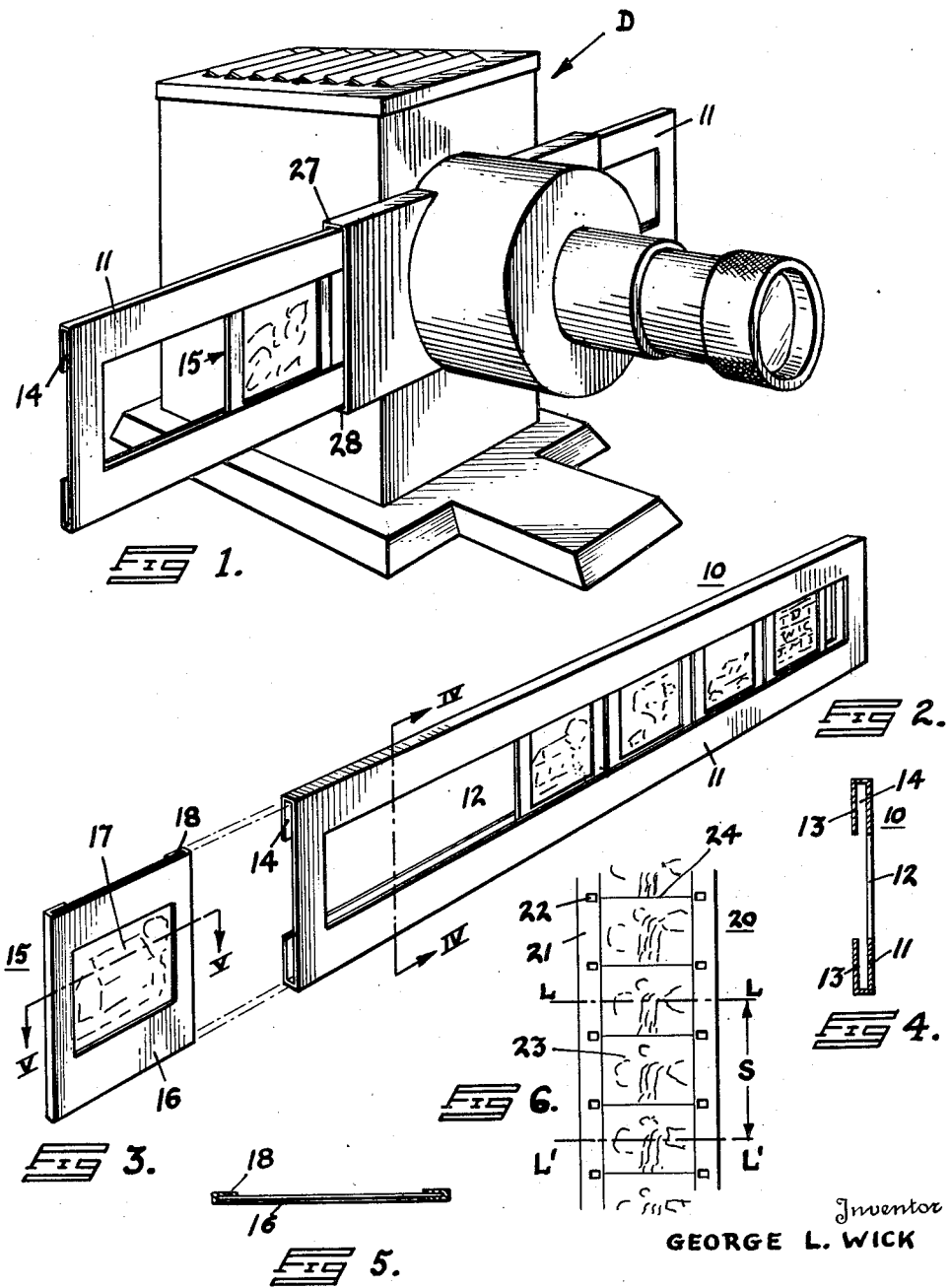
Inventor
GEORGE L. WICK
By Henry W. Kachel
Attorney Patented Feb. 3, 1942

2,271,530

UNITED STATES PATENT OFFICE 2,271,530

FILM HOLDER

George L. Wick, Youngstown, Ohio

Application March 12, 1940, Serial No. 323,559

7 Claims. (Cl. 88—26)

This invention relates to a method and apparatus for holding films and more particularly to an arrangement for maintaining the position and alignment of individual frames severed from a continuous film. It is often desirable to show or project individual frames of a continuous film, such as is employed in motion picture and certain kinds of automatic still cameras, and it is the primary object of this invention to provide a convenient method and inexpensive apparatus whereby the individual frames of the film may be severed from the continuous film and suitably retained either for visual inspection or projection in an image projector of conventional and economical design.

In accordance with an important object of the invention, a method is provided whereby the proper locations of the lines of severance of the film sections containing the desired frames may be expeditiously determined so that when the sections are invested in the holding means the frames will be properly aligned relative to the lens and other parts of the projection apparatus.

A further object of the invention is the provision of an improved apparatus for retaining the severed film sections which apparatus may be economically constructed and readily used without requiring any tools or supplies other than any conventional severing means such as a knife blade or a shears.

Yet a further object of the invention involves the concept that a portion of the film section retaining apparatus may be constructed to slidably fit within complementary guides of a projection apparatus whereby the apparatus required in projecting the images is further simplified.

These and other objects and advantages of the invention will become apparent from a consideration of the following detailed specification and the accompanying drawing wherein there is specifically disclosed a preferred embodiment of the invention.

In the drawing:

Figure 1 is a perspective view of a projector showing the improved film holder of the invention in operative position in the projector;

Figure 2 is a perspective view of the slide part of the film holder of the invention;

Figure 3 is a perspective view of a sub-frame or support of the film holder of the invention;

Figure 4 is a cross-section of the slide of Figure 2, the view being taken along the line IV—IV of Figure 2;

Figure 5 is a cross-sectional view of the support of Figure 3 taken along the line V—V of Figure 3; and Figure 6 is a representation of a portion of a motion picture or other continuous film with which the invention may be identified.

The apparatus of the invention consists generally of a principal frame or slide, indicated generally by the reference numeral 10, provided with longitudinally extending guides adapted to slidably receive one or more of the sub-frames or supports, generally indicated by the reference numeral 15. Slide 10 is preferably constructed of light gauge sheet metal and may consist of a front plate 11, having an elongated opening or window 12 therein and turned-in side edges 13 to provide upper and lower guiding slots 14 for the slidable reception of the supports 15. One end of the slide 11 is preferably closed off to limit the movement of the supports in one direction relative to the slide.

The sub-frames or supports 15 are likewise preferably constructed of thin sheet metal and have a front plate 16 with an opening or window 17 therein and turned-in side edges 18 to define slots or grooves for the slidable reception of the side edges of the film. The window 17 is preferably equally spaced between the ends of the support and, for reasons to be hereinafter explained, the total interval between the ends of the support are preferably equal to twice the heighth of an individual frame of the film with which the support is to be used. The slide 10 is of such width that the ends of the support 15 may be received within the guide grooves 14 of the slide with sufficient looseness to insure the easy insertion of the supports but, however, without undue looseness of the parts. The support 15 is open at either end and it should be obvious that, if the section of film mounted in the support is equal to the length of the support, the bottom walls of the grooves 14 of the slide 10 will prevent longitudinal movement of the film section relative to the support 15.

Referring now to Figure 6 which illustrates a portion of a continuous film of the kind which may be utilized in motion picture cameras and projectors, for example, a film, indicated generally at 20, includes two outer marginal edge portions 21 in which are located the apertures 22 which cooperate with the mechanical parts of the camera and projector. Intermediate the marginal portions 21 is the sensitized area on which the images are developed and this area is divided longitudinally into a series of areas herein termed frames, each of which defines a complete image. The frames are separated from each other by lines 24. In carrying out the present invention one of the supports 15 is applied to the film either by threading the film through the support or by buckling a portion of the film until the side edges thereof can be inserted in the slots or recesses in the support 15 and the support may thereupon be slid along the frame until the desired image on the film is accurately aligned within the window 17 and for this purpose the lines 24 on the film may be aligned with the top and bottom marginal edges of the window 17. With the support so indexed relative to the film, the film is severed along the top and bottom edges of the support by a knife edge, shears or other suitable implement. The lines of severance are indicated on Figure 6 by the lines L—L and L'—L' and the intervening film, which is herein termed a film section, is designated by the reference S.

It should be apparent that in the practice of the invention any number of the small supports 15 may be employed with a section of film cut for each of the supports and the supports containing the sections may in turn be selectively positioned in the slide 10 for insertion in the projector, indicated generally by the reference letter P. For this purpose, and in accordance with the usual practice, the projector is provided with suitable upper and lower guide slots 27 and 28, respectively, to slidably receive the slide 10. Since the slide 10 may carry a number of the supports 15, the image projected may be changed by moving the slide a distance equal to the interval between adjacent images and, if desired, suitable stop and indexing means may be employed to insure that the slide is moved through the proper distance.

It should be noted that the lines L—L and L'—L', which are spaced apart a distance equal to the length of the supports 15, intersect alternate frames of the film midway between the top and bottom of the frames and these lines of severance are preferably so disposed that a minimum number of frames are destroyed in practicing the invention. Thus alternate frames of the series may be made available for still projection or in the case of motion pictures the film may be respliced without substantial interruption of the continuity of the motion.

The above specifically described embodiment of the invention should be considered as illustrative only as obviously many changes may be made therein without departing from the spirit or scope of the invention. For example, the slide 10 may be made of a wide variety of materials and of many different specific constructions, since it is only necessary that the slide be provided with means to receive and retain the subframes of supports 15 and with means to slidably engage the complementary guiding surfaces of the projector with which the slide is to be used. The same is true of the support 15, the only essential function of which is to engage a portion of the film leaving the image frame open for projection. Also, it should be apparent that certain features of the invention are applicable in the mounting and/or projection of individual film negatives as distinguishes from the severed sections of a continuous film. Reference should therefore be had to the appended claims in determining the scope of the invention.

Having thus clearly described my invention, what I claim and desire to protect by Letters Patent is:

1. Apparatus for the still projection of individual frames of a motion picture film comprising in combination a slide adapted to fit within and be moved relative to complementary guides of an image projector, said slide having spaced parallel inwardly opening slots extending longitudinally therealong and substantially coextensive therewith, and a plurality of open ended supports slidably received in and between said slots with the open ends engaging the bottom walls of said slots, each of said supports having an opening therethrough of a size to fit one of the frames of the film and adapted to receive a film section of a length equal to the interval between said ends whereby said walls are operative to retain the film sections in said supports in their predetermined lengthwise position relative to said supports and said slide.

2. Apparatus for the still projection of individual frames of a continuous film comprising in combination a slide adapted to fit within and be moved relative to complementary guides of an image projector, said slide having spaced parallel inwardly directed guiding surfaces extending longitudinally therealong, a plurality of film section supports slidably received in said guiding surfaces, the ends of said supports being open and engaging said guiding surfaces, each of said supports having an opening therethrough of a size to fit one of the frames of the film and adapted to receive a severed film section of a length equal to the interval between said ends whereby certain of said guiding surfaces are operative to retain the film sections in said supports in their predetermined lengthwise position relative to said supports and said slide.

3. Apparatus for the still projection of individual frames of a continuous film comprising in combination a slide adapted to fit within and be moved relative to complementary guides of an image projector, said slide comprising a plate having turned in side edges to define a pair of spaced parallel interior guides, an elongated window in said plate, a plurality of film section supports slidably mounted in said interior guides, the ends of said supports being open and engaging in said interior guides, each of said supports having an opening therethrough of a size to fit one of the frames of the film and adapted to receive a severed film section of a length equal to the interval between said ends whereby said interior guides are operative to retain the film sections in said supports in their predetermined lengthwise position relative to said supports and said slide.

4. Apparatus for the still projection of individual frames of a continuous film comprising in combination a slide adapted to fit within and be moved relative to complementary guides of an image projector, said slide comprising a plate having turned-in side edges to define a pair of spaced parallel interior guides, an elongated window in said plate, a plurality of film section supports slidably mounted in said interior guides, each of said supports comprising a plate having turned-in side edges to retain a section of film, said supports being each provided with an opening of a size to fit one of the frames of the film, said supports being open-ended with the open ends fitting within said interior guides whereby said interior guides are operative to retain the film sections in said supports in their predetermined lengthwise position relative to said supports and said slide.

5. Apparatus for the still projection of individual frames of a continuous film comprising in combination a slide adapted to fit within and be moved relative to complementary guides of an image projector, said slide having spaced parallel inwardly directed guiding surfaces extending longitudinally of the slide, a plurality of film section supports slidably mounted in said guiding surfaces of said slide, each of said supports comprising a plate having turned-in side edges to retain a section of film, each of said supports being provided with an opening of a size to fit one of the frames of the film, said supports being open-ended with the open ends fitting within said guiding surfaces whereby said surfaces are operative to retain the film sections in said supports in their predetermined lengthwise position relative to said supports and said slide.

6. Apparatus for the still projection of individual frames of a continuous film comprising in combination a slide adapted to fit within and be moved relative to complementary guides of an image projector, said slide having spaced parallel inwardly directed guiding surfaces extending longitudinally therealong, an elongated opening in said slide intermediate said surfaces, a film section support slidably received in said guiding surfaces, said support having spaced parallel inwardly directed guiding surfaces extending generally at right angles to said first mentioned guiding surfaces and adapted to receive the side edges of a section of film, the ends of said support being open and engaging said first mentioned guiding surfaces, said support having an opening therethrough to accommodate one of the frames of the film and adapted to receive a severed film section of a length equal to the interval between said ends whereby certain of said first mentioned guiding surfaces are operative to retain the film section in said support in its predetermined lengthwise position relative to said support and said slide.

7. Apparatus for the still projection of individual frames of a continuous film comprising in combination a slide adapted to fit within and be moved relative to complementary guides of an image projector to exhibit in succession a plurality of negative frames mounted in said slide, said slide having spaced parallel inwardly directed guiding surfaces extending longitudinally therealong, said surfaces being adapted to simultaneously retain a plurality of individual film supports arranged longitudinally in said slide, each of said supports comprising a member to engage and guide the opposite edges of a piece of film and having an opening therethrough substantially coincident with the frame area of said piece of film, said slide being simultaneously open to an extent at least sufficient to coincide substantially with said openings in all of said supports in said slide.

GEORGE L. WICK.